(12) United States Patent
Benda et al.

(10) Patent No.: US 8,756,090 B2
(45) Date of Patent: *Jun. 17, 2014

(54) TRANSPORT VEHICLE CAPACITY MAXIMIZATION LOGISTICS SYSTEM AND METHOD OF SAME

(75) Inventors: Peter Benda, Highland Park, IL (US); Steven LaVoie, Chicago, IL (US); William Osborn, Frisco, TX (US); Gary C. Davison, Chicago, IL (US); Peter D. Rocha, Chicago, IL (US)

(73) Assignee: ArrowStream, Inc., Chicago, IL (US)

( * ) Notice: Subject to any disclaimer, the term of this patent is extended or adjusted under 35 U.S.C. 154(b) by 846 days.

This patent is subject to a terminal disclaimer.

(21) Appl. No.: 12/906,634

(22) Filed: Oct. 18, 2010

(65) Prior Publication Data

US 2011/0029448 A1  Feb. 3, 2011

Related U.S. Application Data

(63) Continuation of application No. 11/110,781, filed on Apr. 18, 2005, now Pat. No. 7,840,429, which is a continuation-in-part of application No. 09/751,144, filed on Dec. 29, 2000, now Pat. No. 6,937,992.

(51) Int. Cl.
*G06Q 10/00* (2012.01)
(52) U.S. Cl.
USPC ..................................... 705/7.11
(58) Field of Classification Search
USPC ..................................... 705/7.11
See application file for complete search history.

(56) References Cited

U.S. PATENT DOCUMENTS

| | | |
|---|---|---|
| 3,591,724 A | 7/1971 | Yaku et al. |
| 3,784,802 A | 1/1974 | Imai et al. |
| 3,880,299 A | 4/1975 | Zollinger et al. |
| 3,958,102 A | 5/1976 | Burt |
| 3,974,481 A | 8/1976 | Ledieu et al. |
| 4,053,741 A | 10/1977 | Ainoya et al. |
| 4,345,116 A | 8/1982 | Ash et al. |
| 4,459,663 A | 7/1984 | Dye |
| 4,553,222 A | 11/1985 | Kurland et al. |
| 4,646,238 A | 2/1987 | Carlson, Jr. et al. |
| 4,669,047 A | 5/1987 | Chucta |
| 4,669,113 A | 5/1987 | Ash et al. |
| 4,704,724 A | 11/1987 | Krishnan et al. |
| 4,713,761 A | 12/1987 | Sharpe et al. |
| 4,734,858 A | 3/1988 | Schlafly |
| 4,744,024 A | 5/1988 | Potash et al. |
| 4,744,027 A | 5/1988 | Bayer et al. |
| 4,797,839 A | 1/1989 | Powell |
| 4,887,207 A | 12/1989 | Natarajan |
| 4,887,208 A | 12/1989 | Schneider et al. |
| 4,924,386 A | 5/1990 | Freedman et al. |
| 5,008,827 A | 4/1991 | Sansone et al. |

(Continued)

FOREIGN PATENT DOCUMENTS

EP    0639815 A2    2/1995
WO   PCT/US01/49352   12/2001

OTHER PUBLICATIONS

U.S. Appl. No. 12/906,474, filed Oct. 18, 2010, Benda.
U.S. Appl. No. 12/906,528, filed Oct. 18, 2010, Benda.

(Continued)

*Primary Examiner* — Romain Jeanty
(74) *Attorney, Agent, or Firm* — Barich IP Law Group

(57) ABSTRACT

Disclosed is a system for substantially optimizing logistics for loading vehicles and transporting goods and a method of accomplishing the same.

20 Claims, 7 Drawing Sheets

(56) References Cited

U.S. PATENT DOCUMENTS

| | | | |
|---|---|---|---|
| 5,051,914 A | 9/1991 | Sansone et al. |
| 5,068,797 A | 11/1991 | Sansone et al. |
| 5,072,401 A | 12/1991 | Sansone et al. |
| 5,101,352 A | 3/1992 | Rembert |
| 5,119,307 A | 6/1992 | Blaha et al. |
| 5,148,365 A | 9/1992 | Dembo |
| 5,193,065 A | 3/1993 | Guerindon et al. |
| 5,216,593 A | 6/1993 | Dietrich et al. |
| 5,224,034 A | 6/1993 | Katz et al. |
| 5,265,006 A | 11/1993 | Asthana et al. |
| 5,343,388 A | 8/1994 | Wedelin |
| 5,408,663 A | 4/1995 | Miller |
| 5,450,317 A | 9/1995 | Lu et al. |
| 5,485,369 A | 1/1996 | Nicholls et al. |
| 5,548,518 A | 8/1996 | Dietrich et al. |
| 5,630,070 A | 5/1997 | Dietrich et al. |
| 5,630,123 A | 5/1997 | Hogge |
| 5,631,827 A | 5/1997 | Nicholls et al. |
| 5,649,113 A | 7/1997 | Zhu et al. |
| 5,764,543 A | 6/1998 | Kennedy |
| 5,787,283 A | 7/1998 | Chin et al. |
| 5,803,502 A | 9/1998 | Noll et al. |
| 5,832,532 A | 11/1998 | Kennedy et al. |
| 5,835,377 A | 11/1998 | Bush |
| 5,845,258 A | 12/1998 | Kennedy |
| 5,870,715 A | 2/1999 | Belitz et al. |
| 5,880,958 A | 3/1999 | Helms et al. |
| 5,893,076 A | 4/1999 | Hafner et al. |
| 5,930,156 A | 7/1999 | Kennedy |
| 5,931,900 A | 8/1999 | Notani et al. |
| 5,937,155 A | 8/1999 | Kennedy et al. |
| 5,943,244 A | 8/1999 | Crawford, Jr. et al. |
| 5,946,662 A | 8/1999 | Ettl et al. |
| 5,974,395 A | 10/1999 | Bellini et al. |
| 5,983,194 A | 11/1999 | Hogge et al. |
| 5,983,198 A | 11/1999 | Mowery et al. |
| 5,993,198 A | 11/1999 | Adams et al. |
| 5,995,945 A | 11/1999 | Notani et al. |
| 6,031,984 A | 2/2000 | Walser |
| 6,047,290 A | 4/2000 | Kennedy et al. |
| 6,055,519 A | 4/2000 | Kennedy et al. |
| 6,055,533 A | 4/2000 | Hogge |
| 6,070,147 A | 5/2000 | Harms et al. |
| 6,076,108 A | 6/2000 | Courts et al. |
| 6,085,220 A | 7/2000 | Courts et al. |
| 6,088,648 A | 7/2000 | Shah et al. |
| 6,195,590 B1 | 2/2001 | Powell |
| 6,219,653 B1 | 4/2001 | O'Neill et al. |
| 6,321,207 B1 | 11/2001 | Ye |
| 6,341,271 B1 | 1/2002 | Salvo et al. |
| 6,374,178 B2 | 4/2002 | Nakagawa et al. |
| 6,567,788 B1 | 5/2003 | Johnson, Jr. |
| 6,937,992 B1 | 8/2005 | Benda |
| 7,257,552 B1 | 8/2007 | Franco |
| 7,689,317 B2 | 3/2010 | McGrady et al. |
| 7,840,429 B2 | 11/2010 | Benda |
| 2002/0019759 A1 | 2/2002 | Arunapuram et al. |
| 2002/0049622 A1 | 4/2002 | Lettich et al. |
| 2002/0128890 A1 | 9/2002 | Dick et al. |
| 2003/0033180 A1 | 2/2003 | Shekar et al. |
| 2003/0212614 A1 | 11/2003 | Chu et al. |
| 2005/0267791 A1 | 12/2005 | LaVoie |
| 2011/0029414 A1 | 2/2011 | Benda |
| 2011/0029446 A1 | 2/2011 | Benda |
| 2011/0035327 A1 | 2/2011 | Benda |

OTHER PUBLICATIONS

U.S. Appl. No. 12/906,589, filed Oct. 18, 2010, Benda.
U.S. Appl. No. 11/114,364, filed Apr. 26, 2005, Steven LaVoie.
Walter J. Bell et al., Improving the Distribution of Industrial Gases with an On=Line Computerized Routing and Scheduling Optimizer, Dec. 6, 1983, pp. 4-23.
David R. Goodson, The North American Truckload Rate Index, vol. IV, 2001, 13 pages.
Dimitri P. Bertsekas, Auction Algorithms for Network Flow Problems: A Tutorial Introduction, May 1992, pp. 1-54.
I-Lin Wang, On Solving Origin-Destination Multicommodity Network Flow (ODMCNF) Problem, Mar. 15, 2001, pp. 1-8.
Takkula, Overview over optimization models in transportation, Rev. 1.6, Mar. 30, 2000, pp. 1-14 with 2 internet sheets (Research Index).
Teodor Gabriel Crainic, A Survey of Optimization Models for Long-Haul Freight Transportation,Dec. 1998, pp. 1-78.
IBM, RFP Response to ABC Company, Sep. 19, 2000, Confidential, pp. 1-28.
IBM, Continuous Replenishment Service, Executive Overview, IBM Supply Chain Solutions, copyright 1997, pp. 1-8.
CDM Tests a Dock Operations Application at Viking Freight, Inc., CDM Technologies, Inc.. Nov. 1, 2000.
Hoffman, Kurt; Ford Develops Different Kind of Engine—One that Powers the Supply Chain, Global Logistics and Supply Chain Strategies, Nov. 2000, pp. 42-50.
Keenan, Faith; One Smart Cookie, Business Week E Biz, Nov. 20, 2000, pp. EB120.
Keenan, Faith; Logistics Gets a Little Respect, Business Week E Biz, Nov. 20, 2000, pp. EB113.
Ford, L.R. Jr., et al, "Maximal Flow Through a Network", Canadian Journal of Mathematics, vol. 8, pp. 399-404, 1956.
Ford, L.R. Jr., et al, "A Simple Algorithm for Finding Maximal Network Flows and an Application to the Hitchcock Problem", Canadian Journal of Mathematics, vol. 9, pp. 210-218, 1957.
Ford, L.R. Jr., et al, "Flows in Networks", Princeton University Press, Princeton, NJ, 1962.
Bernie, "Information Pulls Food Distribution", Jul. 1997, Material Handling Engineering, p. S4-S8; Dialog file 9, Accession No. 1053130.
Sean, "Certifying a System's Security—A Look At Government Security Classifications and What They Mean to You", Dec. 1990 UNIX Today, 1990, n. 048, 35, Dialog file 9, Accession No. 00572326.
Carol, "From here to there (cross docking by wholesalers) (includes realted articles": Jan. 1994, U.S. Distribution Journal, v221, n1 p. 25(4); Dialog file 148, Accession No. 07187155.
Caplice & Sheth, A Review and Evaluation of Logistics Metrics, vol. 5, Issue 2, 11-28, 1994.
Office Action dated Jan. 22, 2003 for U.S. Appl. No. 09/751,144, filed Dec. 29, 2000.
Office Action dated May 28, 2003 for U.S. Appl. No. 09/751,144, filed Dec. 29, 2000.
Office Action dated Dec. 2, 2003 for U.S. Appl. No. 09/751,144, filed Dec. 29, 2000.
Office Action dated Mar. 15, 2004 for U.S. Appl. No. 09/751,144, filed Dec. 29, 2000.
Office Action dated Jun. 15, 2004 for U.S. Appl. No. 09/751,144, filed Dec. 29, 2000.
Office Action dated Sep. 15, 2004 for U.S. Appl. No. 09/751,144, filed Dec. 29, 2000.
Office Action dated May 14, 2009 for U.S. Appl. No. 11/110,781, filed Apr. 18, 2005.
Office Action dated Dec. 9, 2008 for U.S. Appl. No. 11/114,364, filed Apr. 26, 2005.
Office Action dated Sep. 14, 2009 for U.S. Appl. No. 11/114,364, filed Apr. 26, 2005.
Office Action dated Jan. 19, 2011 for U.S. Appl. No. 11/114,364, filed Apr. 26, 2005.

TRANSPORT VEHICLE CAPACITY MAXIMIZATION LOGISTICS SYSTEM AND METHOD OF SAME

RELATED APPLICATIONS

This application is a continuation of application Ser. No. 11/110,781, filed Apr. 18, 2005, which is a Continuation-in-Part application of application Ser. No. 09/751,144 filed on Dec. 29, 2000, which issued as U.S. Pat. No. 6,937,992, which are hereby incorporated by reference in their entirety.

FEDERALLY SPONSORED RESEARCH OR DEVELOPMENT

[Not Applicable]

MICROFICHE/COPYRIGHT REFERENCE

[Not Applicable]

TECHNICAL FIELD OF THE INVENTION

The presently described technology relates to an inventory management system wherein inventory levels are controlled.

BACKGROUND OF THE INVENTION

Within the United States, trucks carry the majority of freight, and a large portion of the trucking industry concentrates on less than truckload (LTL) shipments. This is understandable, since many shipments are not large enough to fill a truck, but are too large to economically justify shipment by a parcel carrier such as UPS. As a result, many trucks (and, by extension, other freight transport modalities such as containers, trains, barges, ships and airplanes) carry less than a full load. Since the cost of operating a truck is largely unaffected by the size of its load, this unused capacity represents a substantial economic inefficiency. Without loss of generality, the following argument can be extended to other forms of freight transportation, including trains, barges, airplanes, containers, and ships.

Another industry that has experienced similar problems is the airline industry, particularly since it was deregulated a quarter of a century ago. Upon deregulation, existing airlines faced competition from many new low-cost entrants. During the decade that followed, several incumbent airlines failed (Eastern, PanAm, National). Others, such as American, United, and Delta, gained market share. These incumbents survived and prospered largely by adopting three technologies: hub-and-spoke topologies, yield management, and frequent flier programs.

Hub-and-spoke networks evolved from earlier point-to-point service, channeling passengers from their point of origin to one of several hubs, from which other flights depart. This approach, by separating access to the network of flights from travel within it, allows airlines to offer more departures between an origin and destination, while increasing capacity utilization. The downside is that service now includes a smaller proportion of direct flights, which imposes a convenience cost on the consumer, or an inconvenience due to time constraints.

Another innovation developed by airlines was that of yield management, or the use of fare structure to maximize capacity utilization and revenue per flight. Yield management exploits the fact that airline passengers generally fall into two categories, tourists and business travelers. Tourists are typically price sensitive, but are willing to plan their trips in advance and spend weekends away from home. Business travelers, in contrast, tend to be more willing to pay more to fly, but need to schedule their flights on shorter notice and are less willing to spend their weekends on the road. These different attributes have encouraged airlines to adopt fare policies that differentiate between these two groups. As a result, two otherwise identical tickets on the same flight may have vastly different fares, depending on the time and conditions of purchase. Airlines use fares to maximize yield because they cannot directly control the demand for seats, and can only use fares as an indirect mechanism to do so.

Finally, airlines developed frequent flyer programs to exploit an attribute of how business-related airline tickets are purchased and to encourage customer loyalty. One well-understood effect of frequent flier programs is that they encourage brand loyalty, and therefore reduce price competition between airlines. What drives these programs, however, is the separation of the functions of selecting and paying for a flight for business. In particular, the typical business traveler chooses the carrier, but the employer pays for the ticket. Frequent flier programs thus work by rewarding the traveler directly for how he or she spends the employer's money. Airlines are not alone in using this market structure—other examples include health insurers (who pay for medical services specified and performed by providers) and McDonald's (which markets toward children, even though parents pay).

While the freight transportation and airline industries share many attributes (network structure, different priorities for services, and separation of purchase of and payment for services), the freight industry has been slow to adopt many airline innovations. In trucking, which accounts for the majority of freight hauled in the United States, the industry is segmented into truckload and less than truckload (LTL) hauling. Truckload films operate by running trucks that are usually dedicated to a single customer on a point-to-point basis. Less than truckload firms (which represent a majority of the trucking industry) move loads between points, but put multiple loads on the same truck. By U.S. Department of Transportation definition, the term "truckload" includes motor carriers operating with loads that weigh either more than 10,000 lbs., or loads that require exclusive use of the truck. This excludes parcel carriers such as UPS or Federal Express, and the Postal Service. Other groups classify LTL to include service for loads that weigh between 250-12,000 lbs. In this respect, an LTL firm operates much like an airline, hauling disparate loads while trying to maximize revenue per truck.

Despite the similarities, the LTL trucking industry has failed to keep pace with the airline industry in terms of capacity utilization policies. One area in which the LTL carriers have emulated airlines is the adoption of hub-and-spoke topologies, known in the industry as freight consolidation. Freight consolidation operates by having the LTL carrier pick up the load from the shipper and take it to a nearby warehouse owned by the carrier. The load then waits until enough cargo has accumulated from other orders to justify sending a full truck to another warehouse near the destination. From that point, a third truck takes the load from the warehouse to the final destination. Consolidation thus allows an LTL carrier to reduce the number of miles traveled by partially full trucks. The disadvantage to this approach, however, is that a load to be consolidated must wait until enough goods share a common destination to justify sending a full truck.

Another area in which the freight industry lags behind its air transport counterparts is in yield management. The reason why LTL consolidators must rely on flexible shipping schedules is because they have no direct influence on demand. This is because carriers generally have no direct control over the orders they ship—customers do. As a result, there is no direct link between the carrier cost and level of service, on the one hand, and the order flow, on the other.

Several attempts have been made to more closely match order flow with transportation capacity utilization. One approach, demand synchronization, calls for customers to place their orders with a manufacturer at only a specified time, in order to allow the manufacturer to send the orders out in a more economically efficient batch. A more extreme approach, vendor-managed inventory (VMI), takes the customer out of the ordering process in toto. Under VMI, the manufacturer reviews the customer's inventory, arranges for orders, and sends the goods to the customer with only the customer's tacit approval. Under VMI, the responsibilities of ordering and fulfillment are both assumed by the manufacturer, who minimizes logistics costs, subject to agreed-upon standards for inventory levels and quality of service.

VMI offers many advantages to its users. Both parties gain by reduced data entry errors, faster processing, and better service for customers. Combining responsibilities for ordering and order fulfillment helps make logistics costs an explicit part of the cost calculation. Transportation assets have greater capacity utilization, and loading dock congestion, and warehouse congestion are alleviated.

VMI also offers benefits that accrue solely to the customer. The customer experiences a reduction in order processing time, which produces several beneficial effects. Fill rates from the manufacturer are improved. The level of service increases, since the system can be more responsive to changes in demand. Inventory levels decrease. Additionally, planning and ordering costs are passed back to the supplier, and are therefore eliminated. Finally, since the manufacturer bears responsibility for fulfillment, it is more focused than ever on customer satisfaction.

The supplier also gains from VMI. It gains visibility with customers. Access to customer inventory data makes it easier to forecast demand. Customer ordering errors (and consequent returns) are reduced. Finally, since the manufacturer has control of both orders and freight costs, an incentive exists to coordinate them to reduce total costs.

VMI carries with it several disadvantages, however. First, the customer cedes control of a critical process—purchasing—to a supplier. Such a close relationship requires a degree of trust that is rare in the business world. Second, VMI is based around the one to one relationship between supplier and customer. As a result, while VMI relationships can be economically beneficial, they typically require a large amount of scale to justify, given the fixed costs associated with implementing the VMI solution, and the level of traffic required to fill trucks on a regular basis.

Thus, while VMI may seem to cure all logistical ills, it is difficult to implement universally. As a result, many customer relationships will continue to be based on the traditional model of the customer ordering goods and the supplier paying for freight. In this case, the freight industry has nothing comparable to the third airline achievement—the incentives provided by frequent flier programs. Frequent flier programs work because they target a party, the flier (typically a business flier), who has purchasing authority, but does not have to pay for what is bought. Similarly, in many industries, the customer, when buying a product with a delivered price, indirectly purchases freight services from a carrier, but the manufacturer pays for it. While airlines have been able to address this market characteristic, the closest that the freight industry has come in approaching this mechanism is to use VMI to consolidate these functions.

So, although the LTL industry must deal with a set of problems similar to that faced by the airline industry—network topology, unpredictable demand, and a lack of incentives to coordinate behavior between seller, customer and carrier, it has failed to evolve an effective response. This failure is all the more telling since the freight industry, unlike that for passengers, can directly control cargo; whereas airlines cannot force people, no matter how delightful the destination, onto airplanes.

Previous efforts to optimize logistics have been deductive in nature, accepting the state of the world as a given and attempting to drive towards a more efficient outcome. The presently described technology takes an inductive approach: given that a logistically ideal world is to be achieved, what is the best way to achieve it? As a result, the presently described technology combines variants of the airline innovations of hub-and-spoke topology, order flow control, and trade incentives to optimize the use of logistics assets in a new and economically useful way.

BRIEF SUMMARY OF THE INVENTION

The presently described technology is useful for substantially optimizing a shipment of merchandise, which may, in one embodiment, utilize a method having the steps of:

determining at least one product required to be maintained in inventory by at least two receivers in response to data received from the receivers by at least one shipper; and substantially optimizing the shipment of the product by determining one or more substantially maximum loads of one or more transport vehicles at least in part by calculating an amount of the product for shipment from the at least one shipper by one or more transport vehicles from the shipper to the receivers that reduces logistics costs and maintains the inventory within the amount of product required to be maintained according to an algorithm employing one or more metrics and the data.

The presently described technology is also useful for substantially optimizing a shipment of merchandise, and, in another embodiment, the shipment being to a first receiver maintaining a first inventory of merchandise at a first receiver location and to a second receiver maintaining a second inventory of merchandise at a second receiver location, the shipment of merchandise being from a first shipper located at a first source location and from a second shipper located at a second source location. In such an environment, the presently described technology may comprise:

determining the limits of the merchandise required to be maintained for the first inventory according to one or more first metrics in response to first data received from the first receiver;

determining the limits of the merchandise required to be maintained for the second inventory according to one or more second metrics in response to second data received from the second receiver; and determining one or more maximum loads of one or more transport vehicles at least in part by calculating an amount of merchandise for shipment from the first and second shippers by the one or more transport vehicles from the first and second sources to the first and second receivers that reduces logistics costs and that results in shipment of merchandise within the limits of merchandise required to be maintained for the first inventory and within the limits of merchandise required to be maintained for the second inventory according to an algorithm employing at least the one or more first metrics, the one or more second metrics, the first data and the second data.

DETAILED DESCRIPTION OF THE INVENTION

As described herein, the term shipper is used to denote a company that ships products or goods to another, such as a receiver. However, for the purpose of clarity only, and without being limited thereto, some embodiments may describe shippers as manufacturers and receivers as distributors. In some embodiments, receivers may be customers also. It is understood that the presently described technology is not so limited between manufacturers and distributors. As also explained herein, shippers are different legal entities, or companies that operate separately.

As used herein, the term "vehicle" is used to denote any modality of shipping or anything capable of carrying goods. It can include, but is not limited to, ships, barges, vans, trailers, cars, trucks, trains, airplanes, containers, pallets, cubes, etc.

Also as used herein, the term "product" can mean either the same product(s), a different product(s), or a newly created product(s). In other words, just because product X is initially ordered, does not mean that any further optimized product must be product X, as it could be products Y or Z, etc. The term "product" is also interchangeable with the terms, "merchandise," "good(s)" or "item(s)."

For all embodiments, it should be noted that "capacity", also used synonymously as "load", can be measured as volume capacity (such as cubic capacity, or height, weight, or length) or by weight capacity (such as poundage), or by pallet footprint, or by number of cubes, cartons, containers, boxes, or the like. Also, it should also be noted that capacity is also a function of the size of the vehicle. For example, in the trucking industry, moving from single unit trucks to truck-trailer combinations or semi-trailer combinations can increase capacity. Furthermore, multi-trailer combinations such as double or triple trailer combinations can affect capacity. Trailer size may range, but may include the standard 28 foot, 28.5 foot, or 48 foot trailers. Similarly, cargo hold size, and the number of containers placed above deck may affect capacity in boats/ships or other transport vehicles. Similarly, train capacity is a function of the number of cars, boxcars, liquid container cars, etc. In addition, the number of pallets (usually, but not exclusively, 44 pallets per standard truck) is another possible constraint.

Figure 1:
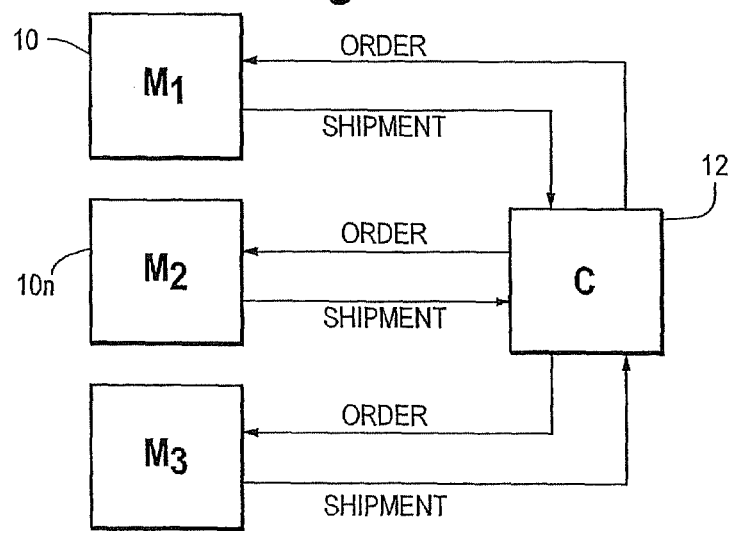
FIG. 1 is a block diagram of the current order-shipping model.

FIGS. 1 through 4 show embodiments of the prior art. In FIG. 1, a manufacturer 10 such as manufacturer M1 receives orders from a receiver, such as customer 12 and then ships the merchandise to the customer 12. The customer 12 can place many orders with other manufacturers 10n, such as manufacturer M2 or M3. In this regard, the logistical issues involve multiple shipments from a plurality of manufacturers 10n to a single customer 12. If the customer 12 orders too little merchandise, then the manufacturer 10 will ship a partial vehicle load to the customer 12. From the customer's vantage, orders must be placed with each individual manufacturer and the customer 12 receives shipments from a plurality of manufacturers. This becomes an administrative problem for the customer. It is a shipping problem also for the manufacturer since it may have to ship small volumes of merchandise to many customers. The large number of small shipments can clog loading docks. Finally, it is well established that the cost per pound is inversely related to the load of the vehicle. This implies that the separation of order control (performed by the customer) and payment of freight cost (performed by the seller) can lead to outcomes that would be more costly than if both parties were better coordinated.

Figure 2:
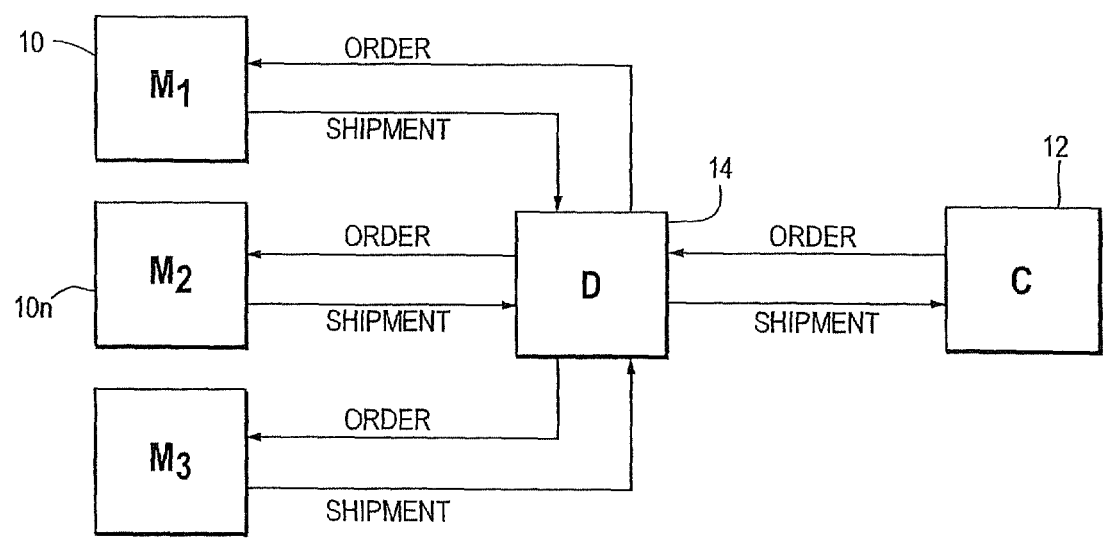
FIG. 2 is a block diagram of the current manufacturer-distributor model.

FIG. 2 demonstrates another embodiment of the prior art and is a further refinement of the embodiment described further in FIG. 1. Shown is a distributor 14 that interfaces between manufacturers and the customer. In this example, the distributor 14 receives orders from the customer 12 and ships merchandise to the customer 12 directly. The distributor 14 may ship many types of merchandise to the customer 12. For example, the customer 12 may order from the distributor some level or amount of merchandise, goods, items, or products from M1, M2, and M3. As the inventory of these products is reduced, the distributor replenishes its stock by placing orders with the respective manufacturers M1, M2, and/or M3. In this regard, the distributor acts as an intermediary in which the customer 12 need only interface with a distributor 14 for most or all of its needs. Even if it deals only with one customer, the distributor can add economic value by providing low cost storage to the customer.

Figure 3:
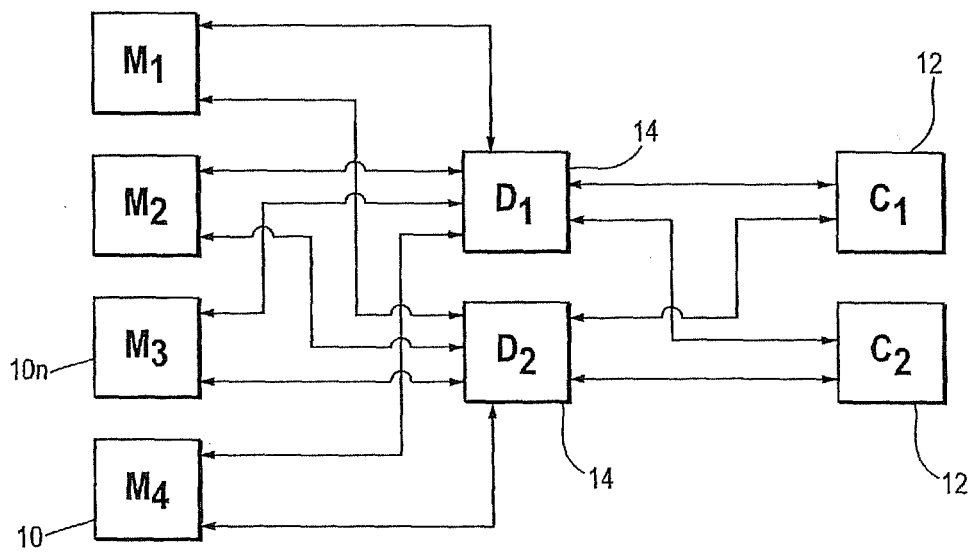
FIG. 3 is a block diagram of a multiple manufacturer multiple distributor model.

FIG. 3 demonstrates yet another embodiment of a larger scale and can be illustrative of the current industry. Shown is the situation in which many customers C1 and C2 interface with many distributors D1 and D2. These distributors may interface with a plurality of manufacturers 10 such as M1 through M4. Since not all distributors carry every manufacturer's merchandise, the customer 12 may have to interface with many distributors. In this regard, again a distributor may ship partial vehicle loads to the customer and the distributor may receive partial vehicle loads from the various manufacturers. Similarly, the distributor may ship partial loads to the customer. One well-understood benefit of this model is that, since each distributor services multiple customers, the total amount of stored goods required will be less than if the goods were stored at each separate customer. Again, this model represents the industry.

Figure 4:
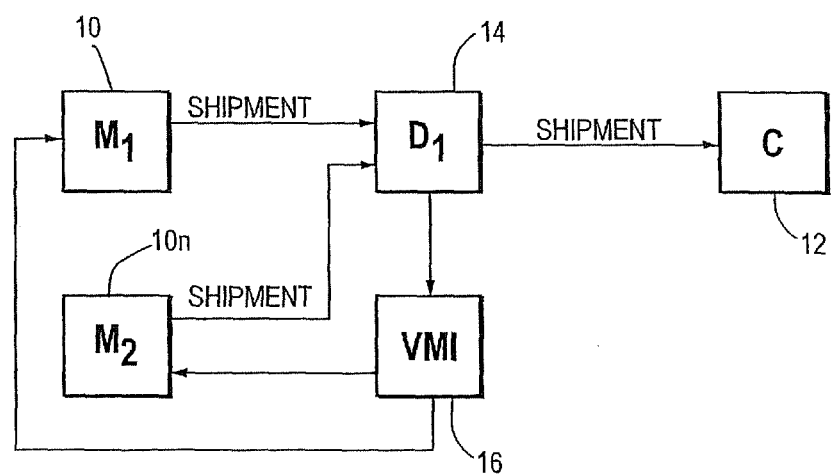
FIG. 4 is a block diagram of a vendor managed inventory model.

FIG. 4 is a Vendor Managed Inventory (VMI) model. As described herein, the VMI model permits open ordering in which the manufacturer monitors the distributor's inventory and replenishes it as needed. This is in sharp contrast with the current paradigm in which the distributor places orders with the manufacturer and maintains control over the ordering process. In FIG. 4, the VMI system 16 monitors the inventory level at the distributor 14. When inventory levels drop, the VMI system 16, usually resident at the manufacturer's situs, sends purchase orders to the manufacturer's shipment center to ship merchandise to the distributor 16 for subsequent shipment to the customer 12. Because the manufacturer takes responsibility for ordering and transportation costs, it is able to send the order to the distributor without the distributor actually requesting each product, good, item, or merchandise.

Figure 5:
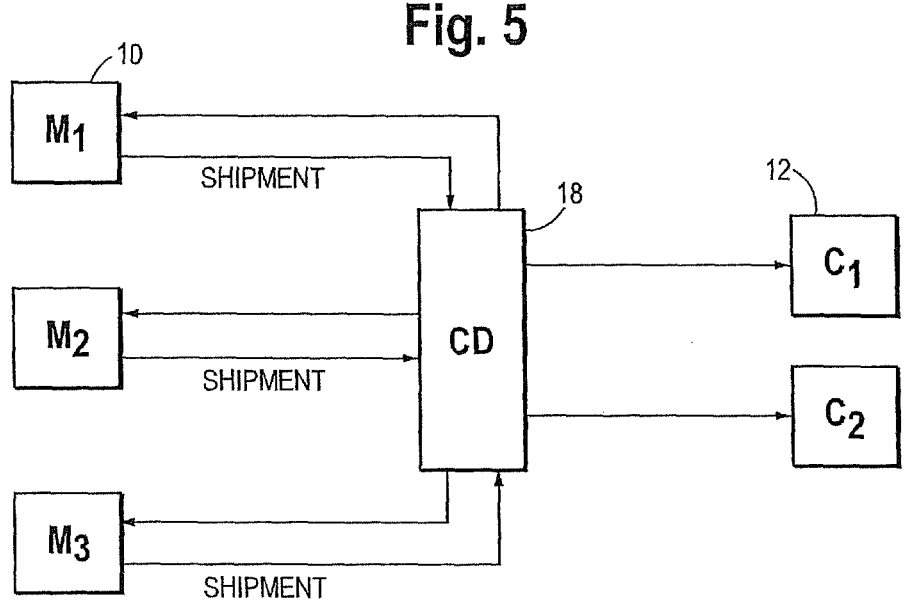
FIG. 5 is one embodiment of the presently described technology.

FIG. 5 demonstrates a simple embodiment of the presently described technology. Shown is the manufacturer 10 interfacing with a central facility or a cross-dock 18, which interfaces with the customers 12. The central facility may be adapted to receive and process inventory information of distributors or customers and then correlate this information to shipments from the manufacturer to the customer. One non-exclusive purpose of the central facility or cross-dock is to maximize transport vehicle capacity. The actual transport vehicle is largely inconsequential so long as the capacity of the vehicle can be determined. For example, it is well known that the standard truck has a capacity of about 44,000 pounds (around 2,000 cubic feet) and/or can carry about 44 pallets of merchandise. Similarly, the standard train car has a predetermined capacity. For example, a 50 foot boxcar has about 6,235 cubic feet and a weight capacity of about 213,000 pounds. A 60 foot boxcar has about 7,500 cubic feet and about 207,000 pounds of weight capacity.

Thus, in its simplest form, maximization of vehicle capacity compares the maximum vehicle capacity measured against the capacity requirements associated with the merchandise initially ordered. The subtraction of these measurements yields the amount of unused capacity. Thus, new merchandise may be added sufficient to fill up and/or substantially optimize this unused capacity. This creates maximum or substantially maximum vehicle capacity. As used herein with respect to the presently described technology, the term "maximum" shall mean any amount or capacity (e.g., in terms of volume, weight, or other applicable parameter) at a substantial level, including but not limited to the substantially greatest quantity or amount feasible or practical. In any embodiment, though, the presently described technology can be modified to manage multi-pickup and multi-drop-off shipments, as well as shipments that travel between cross-docks. Per the presently described technology, filling a vehicle can be done iteratively (while the vehicle is being loaded), or can be filled in advance by manipulating the order sequence of order generation and/or vehicle optimization, before the goods are finally ordered. As used herein with respect to the presently described technology, the terms "optimization", "optimize", and "optimizing" shall mean at a substantially optimal level in terms of a level, an amount, a volume, a weight, or any other applicable parameter.

The filling/loading of the vehicle may concentrate on the filling/loading of a single vehicle, or on providing a globally optimized solution that fills all vehicles going between various destinations. By shifting the load between multiple vehicles, a result can be attained that will be more optimal than first optimizing at the individual vehicle level.

In another embodiment, once the vehicle capacity of a vehicle destined to a particular destination is determined, for example, customer C1, an optimization model can be engaged. In this regard, knowing (e.g., in advance) that a partial truckload is destined from a shipper such as a manufacturer to a receiver such as a customer C1, the central facility can use this information to place additional orders with the manufacturer to increase the amount of merchandise on that shipment. The vehicle is sent to the central facility or the cross-dock (if the two are not at the same location) where the merchandise can be unloaded. Thus, a full truckload or substantially full truckload departs from the manufacturer M1. Similarly, merchandise may be sent from manufacturer M2 and M3, etc., to the cross-dock too, thus having full or substantially full trucks arrive at the cross-dock. At the cross-dock, the merchandise are reorganized and/or commingled such that similarly destined merchandise are placed on the same vehicle and sent to the ultimate customer(s), such as customer C1. Thus, the presently described technology permits trucks to travel full/loaded or substantially full/loaded from the manufacturer(s) to the cross-dock, and from cross-dock to customer(s).

By the way of example, the manufacturers may be large foodservice industry manufacturers, such as M1, M2, and M3, where M1 sells boxes of ketchup to a series of restaurants, M2 may sell boxes of plastic utensils, and M3 sells napkins. Customer C1 may be a restaurant chain that requires ketchup, utensils, and napkins. In this regard, customer C1 could receive shipments from each manufacturer directly as in FIG. 1. However, the presently described technology substantially maximizes truckload capacity such that a substantially full truckload of ketchup boxes leaves M1, a substantially full truckload of utensil boxes leaves M2, and a substantially full truckload of napkins leaves M3. By collecting and reorganizing the merchandise at the cross-dock, a shipment comprising ketchup, utensils, and napkins is sent to customer C1. However, recognizing that the outbound vehicle also has a truck capacity, if the capacity is not maximized, then the central facility will substantially optimize to add extra merchandise, such as more ketchup, utensils, or napkins onto the truck to substantially achieve maximum capacity. Since full or substantially full truckloads are sent from the manufacturer to the customer, significant savings are achieved and few LTL's are dispatched.

By way of further example, if the truckload capacity comprises 100 boxes, and the Customer C1 destined initial shipment comprises 60% ketchup, 30% utensils, and 10% napkins, the extra merchandise added to obtain the 100 box capacity can be prorated among the percentages. For example, if after the initial load capacity is calculated it is found that another 10 boxes can be added to achieve maximum or substantially maximum truckload capacity, then this amount of boxes can be added to achieve the maximum or substantially maximum load. The extra 10 boxes can be prorated among ketchup, napkins, and utensils. Although shown as manufacturers in FIG. 5, this model can also work with distributors. The additional merchandise need not be prorated though, as the additional merchandise can be the result of a bin-packing optimization model that accounts for the three dimensional aspect of the vehicle (pallet layers, pallets, volume, cases, and weight) as well as the differences in the marginal value-added that come from shipping each additional increment of a given product.

To maximize efficiency, the presently described technology may be configured to monitor the demand of the receivers or buyers, the levels of "safety stock" needed to prevent stock-outs, the amount of stock on hand, any promotional stock needed, stock needed for seasonal demand, forecasts of stock demand, stock in transit, priorities of stock needed, etc. Prioritization may occur when the merchandise are needed at different times, such as if the merchandise are perishables, if high revenue merchandise are needed, high profit merchandise is needed, to prevent stock-outs, promotional seasonal, etc. Similarly, the system may be configured to provide reports, such as printouts of the various demands, schedules, etc.

In another embodiment, the presently described technology may determine substantial optimization in a predetermined manner prior to shipping. It is capable of coordinating the shipments from shipper(s) to receiver(s) even before the first shipment actually leaves. In this regard, the presently described technology generates orders for its customers versus generating orders in response to the customer's request. The presently described technology may arrange for and substantially optimizes the transportation and order flow simultaneously, thus pre-scheduling most, if not all, of the shipping components. Since title to the goods remains either with the shipper or receiver, the company operating the presently described technology need not take title to the goods.

Figure 6:
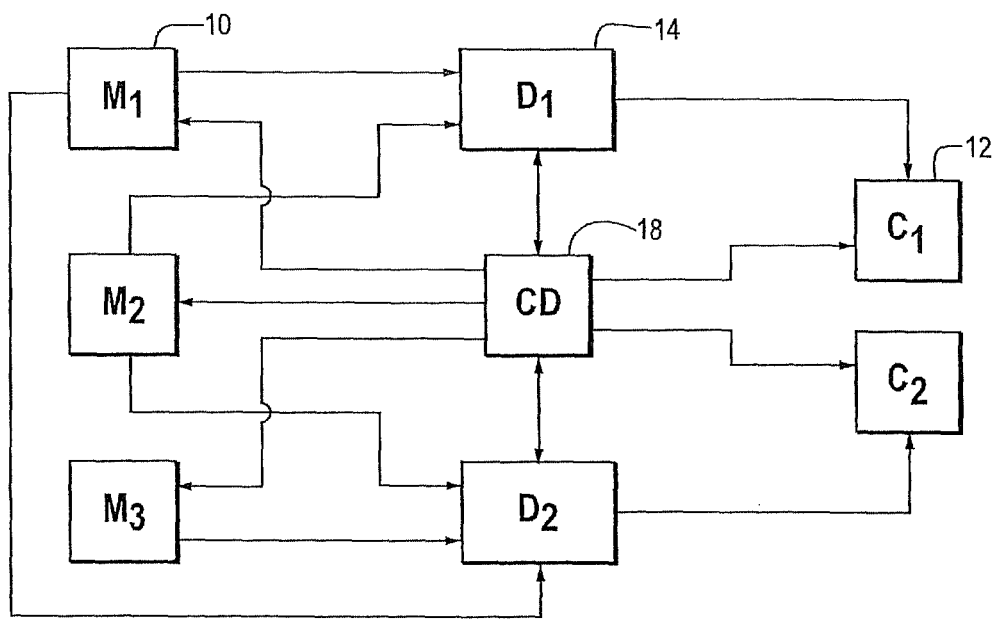
FIG. 6 is another embodiment of the presently described technology.

FIG. 6 demonstrates another embodiment of the presently described technology in which receivers, such as distributors are involved. In this model, a plurality of distributors 14 transport merchandise to a plurality of customers 12. The central facility, which may include the cross-dock 18 may coordinate inventory and orders at the distributor. Again, it should be noted that the cross-dock need not be collocated with the central facility. In this model, a VMI-like system may be used in conjunction with the central facility. Accordingly, as the central facility monitors the distributor's inventory, the central facility prepares to order the merchandise on behalf of the distributor. The central facility, such as cross-dock 18, monitors the merchandise to be shipped to the distributor. The central facility also has enough information to determine on its own if an outgoing truck is full or not. If the truck to be dispatched is not full, the central facility will send an order for more merchandise to be added to the level that will fill or substantially fill the truck. Similarly, the central facility will monitor shipments originating at the other manufacturers such as M2 and M3. In essence, the optimization model creates an order plan for full or substantially full shipments from the manufacturers before it is shipped or before the order is finalized. The coordination with other shipments in the supply chain with the central facility monitoring system is also available.

In any embodiment, the external packaging, external labels, SKU codes, pallet tags, UPC codes, etc., may classify the merchandise. Merchandise lacking any indicia may be tagged in any manner to identify the merchandise. "SKU" stands for a Stock Keeping Unit, which is an identification number assigned to a unique item or a unique type of item by the retailer. The SKU may be an internal number to that retailer or may be tied to an item's UPC (Universal Product Code), EAN (the EAN-UCC identification number), EPC (Electronic Product Code in relation to RFID (Radio Frequency Identification) systems and the like), and GS1 GDSN (GS1 Global Data Synchronization Network, an alternative to the EAN system). Accordingly, the commingling of merchandise is maximized when the merchandise are adequately identified. Naturally in some circumstances, not all merchandise arriving at the cross-dock are destined for the same place. Accordingly, it may be necessary to determine the destinations of each item and further label or track its destination. Thus, marking products with unique destination indicia can facilitate the process of determining destinations of merchandise.

In one embodiment of the presently described technology, a shipment from, for example, M1 can go directly to the distributor D1. Similarly, shipments from M2 can go directly to D1 also. Similarly destined merchandise, such as merchandise going to the same customer C1, can be coordinated such that merchandise from a variety of manufacturers are on the same truck. If the truck is not full/loaded, then the central facility will monitor the capacity and order more merchandise to be loaded onto the truck until it is full/loaded or substantially full/loaded. Thus, a full/loaded or substantially full/loaded truck will arrive at the customer C1. As described more fully herein, the optimization model may consider the option of putting or not putting the truck through the cross-dock.

In another embodiment, the merchandise from the manufacturer may arrive at a cross-dock 18 and its merchandise may commingle with merchandise from other manufacturers. The cross-dock permits loading of similarly destined merchandise for shipment to the same distributor or to the same customer. It should be noted that the system does not just monitor truckload capacity. Rather, it arranges for truckload capacity sufficient to transport the required product.

Thus, in one exemplary model, the cross-dock or central facility may perform some or all of the following steps of receiving forecasts of customer demand for a product: monitoring truckload capacity requirements, arranging orders in such a way that more merchandise is filled or loaded into the truck, commingling the merchandise with other party's merchandise, loading similarly destined merchandise onto the same truck, adding more merchandise if the truck is not full/loaded, and then sending this truck along to a destination, such as another distributor or a customer. The optimization model can take into account the relative schedules of shipments in advance to coordinate arrivals at the cross-dock and outgoing shipments from the cross-dock.

In yet another embodiment of the presently described technology, it is not necessary to commingle merchandise arriving at a cross-dock of various manufacturer's merchandise at the same time. For example, using the models of FIG. 5 and FIG. 6, a full or substantially full truckload of merchandise may arrive at the cross-dock 18 or distributor 14. These newly arrived merchandise may be commingled with merchandise that have been earlier inventoried at the cross-dock or distributor. Merchandise of a similar destination are then placed on the outgoing truck. Any empty capacity can then be filled up with older or lower priority merchandise from the cross-dock or distributor.

In yet a further embodiment, the presently described technology further envisages the coordination of pick-ups and drop-offs of shipments among customers (e.g., C1, C2, etc.), manufacturers (e.g., M1, M2, etc.), and/or distributors (D1, D2, etc.), for example, through a central facility and/or cross-dock. Such coordinated picking up and dropping off of shipments allows each customer, manufacturer, and/or distributor (i.e., collectively "members" utilizing the presently described technology) to schedule such shipment activities in a manner that is mutually beneficial. For example, a member can schedule a truck that has taken product to one receiver to then pick up product from somewhere near that receiver's location and deliver that product to a second receiver location somewhere near the original shipping location (e.g., the original departure point of the truck). Thus, where the truck would originally depart with shipment for one "member" and return to its original departure location empty, the truck now also picks-up and drops-off shipments to other "members" (i.e., C's, M's, or D's) utilizing the presently described technology as well. Such a coordinated option is not available in systems that do not allow for or offer coordination between its same or different "members".

One simple implementation of optimization technology to the current invention can be viewed as a variant on the well-understood maximum flow method developed by Ford and Fulkerson. This approach makes some simplifying assumptions. Only one set of cost constraints applies (e.g., product density per unit shipped is sufficiently high to ensure that weight will always be the constraint). Additionally, the goods shipped is assumed to be either continuous or sufficiently discrete to permit high granularity of shipments. In addition, each type of product is available from only one geographic source. Finally, all shipments under this simple model are assumed to pass through a single cross-dock.

To apply this technique to the problem, each combination of source, destination, and product type (e.g., SKU) is assigned a value associated with a performance metric, a single cost constraint (e.g., weight), the ratio of performance metric to cost constraint, a minimum amount to ship, and a maximum amount to ship. In addition, the algorithm uses a matrix or list of nodes, including sources of goods, destinations of goods, and cross-docks, as illustrated in FIG. 5 and FIG. 6.

Under this approach, the computer running the program traverses the list of source-destination-SKU combinations to determine the minimum shipment requirements for each source-destination-SKU combination. The program also creates and generates a list of sources and destinations that tracks the amount of shipping required to move goods between each source and each destination via the cross-dock. The result of this step is a matrix that lists each combination of source and destination, and the total amount of shipping capacity required to transport the required minimum shipment of goods from its respective source to its respective destination.

Furthermore, the computer with memory running the program also traverses the source-destination-SKU list to determine the amount of shipping required to ship the amount of goods that must be shipped. Since this implementation assumes only a single cross-dock, vehicle capacity must be assigned to the trip from the source to the cross-dock and from the cross-dock to the destination. Whenever insufficient vehicle capacity exists to carry all mandatory orders on a given route into or out of the cross-dock, another vehicle is assigned to that route. Assigning goods to a vehicle and assigning a vehicle to a route changes the amount of excess capacity available to carry discretionary goods on that route.

Eventually the computer with memory running the program processes the mandatory orders for all source-destination-SKU combinations. This operation results in a set of unused vehicle capacities from each source that has shipped mandatory orders into a cross-dock, and from the cross-dock to each destination that will receive mandatory orders of goods that have passed through cross-dock.

Once the total shipping capacity required to move the required number of goods between any source and destination is determined, the computer with memory operating the program then sorts the list of source-destination-SKU combinations by the ratio of the performance metric to the cost constraint. This process yields a list that provides the order in which the program should evaluate adding discretionary goods to the order plan and to the shipping capacity that travels between a given source and destination.

The computer with memory then traverses the sorted list of source-destination-SKU combinations. For each source-destination-SKU combination, it determines if additional discretionary orders are possible, if spare capacity exists going from the source to the cross-dock, and from the cross-dock to the destination. It also calculates the minimum of the amount of discretionary orders available, shipping capacity into the cross-dock, and capacity out of the cross-dock. This number is the maximum or substantially maximum amount of discretionary orders that can be placed, given the number of vehicles assigned to each route (e.g., maximum or substantially maximum and feasible order size).

At this point, the computer with memory running the program adds an order in the amount of the maximum feasible order size to the order plan, and reduces the available capacity going from the source to the cross-dock and from the cross-dock to the destination by the combined cost constraint represented by the amount of the maximum feasible order size.

This procedure is repeated for each successive member of the sorted source-destination-SKU list until the list is traversed or there is no more available capacity/substantial capacity. The computer then generates a source-destination-SKU list that denotes the amount of each good ordered from each source by each destination. It also generates a list or shipping plan denoting how many items are being shipped from each source through the cross-dock to each destination, and on what vehicle they will be transported.

This relatively simple method can be supplemented by allowing for the possibility that shipments can travel directly from the source to the destination without passing through the cross-dock, or that a given path between a source and destination can include either multiple sources of product (multiple pickup) or multiple destinations (multiple drop-off).

A more complete approach of the presently described technology uses integer linear programming to solve a multistage transshipment problem. In this case, the system is again modeled as a network of sources, destinations, and cross-docks. In this case, the algorithm maximizes the difference between positive (e.g., revenue) and negative (e.g., cost) performance metrics, subject to the usual constraints found in a transshipment problem, including vehicle capacity (e.g., height, weight, width, length, volume), non-negativity of shipment quantities, zero product left at a cross-dock, etc.

An additional extension of the presently described technology would include the ability to commingle products traveling between different legal entities with those of the same entity. Thus, for example, the presently described technology may note that product is required at a facility in Houston, and that there is a large supply of product at a facility in Dallas owned by the same distributor. In this case, the presently described technology may be able to determine that the substantially optimal solution to the problem would involve adding product from the Dallas facility to a vehicle traveling from Chicago to Houston via Dallas.

The Ford-Fulkerson models are described in the following articles, the disclosures of which are expressly incorporated by reference herein: L. R. Ford, Jr. and D. R. Fulkerson, Maximal Flow Through a Network, Canadian Journal of Mathematics, 8:399-404 (1956); L. R. Ford, Jr. and D. R. Fulkerson, A Simple Algorithm for Finding Maximal Network Flows and an Application to the Hitchcock Problem, Canadian Journal of Mathematics, 9:210-218 (1957); and L. R. Ford, Jr. and D. R. Fulkerson, Flows in Networks, Princeton University Press, Princeton, N.J. (1962). Other models include branch and bound algorithms.

Technology also may be derived from other simulation oriented software such as "war games" or chess software that play out various permutations, combinations, or solutions, predicts the best "move" and executes it.

Another implementation of the presently described technology optimizes shipments of standardized pallets for each given SKU on standardized vehicles. This approach further assumes that a profit-maximizing firm receives revenue from manufacturers to deliver product from a source S to a destination D over a fully connected network of nodes N, which may be sources, destinations, or transshipment points. In this approach, the firm selects routes R for pallets and r for vehicles, both of which consist of an ordered finite list of nodes. Routes R or r may also include no elements, which denotes that the pallet is not shipped, or that the vehicle is not employed.

For this approach, the optimization problem can be represented as a variant of transshipment problem in which the two sets of control variables are the number of pallets of product type SKU traveling in vehicle V on route R from source S to destination D, $x_{SKU,V,R,S,D}$, and the route of each vehicle V, $r_V$.

$$\underset{x_{SKU,V,R,S,D}, r_V}{\text{Max}} \sum_{SKU} \sum_{S} \sum_{D} \text{Income}(SKU, S, D) x_{SKU,V,R,S,D} -$$

$$\sum_{V} \text{VehicleCost}(r_V, V) -$$

$$\sum_{n} \sum_{SKU} \text{PerNodeCost}(x_{SKU,V_1,R,S,D,i,n}, x_{SKU,V_2,R,S,D,n,j}) x_{SKU,V_1,R,S,D,i,n}$$

The above objective function for the firm consists of three different elements. The first is the revenue function for shipping a pallet of type SKU to a destination D, times the number of pallets of product type SKU shipped from source S to destination D. This formulation of the revenue function permits the possibility of the firm receiving different levels of revenue from the manufacturer depending where the firm picks up the product from the manufacturer.

The first cost component is the cost of running all vehicles V along all routes $r_V$. The second cost component represents the total cost of all pallets of type SKU traversing a node n. In this expression, the expression $x_{SKU,V,R,S,D,i,n}$ represents the number of pallets of product type SKU moving on vehicle V following route R from source S to destination D that travel between nodes i and n. Note that the formulation of this function permits the pallets to arrive at node n on one vehicle and leave it on another. Thus, the per node cost can be used to account for cross-docking fees as the pallet, moving on route R on vehicle $V_1$, arrives at node n from node i, and is transferred to vehicle $V_2$ moving to node j. In this formulation, the PerNodeCost is expressed on a per pallet basis, and can vary as a function of the product type. Note that, although $V_1$ and $V_2$ are separate variables, they can both refer to the same vehicle. Note also that this system can be used to account for pickup or delivery costs by setting i to S or j to D, respectively.

This system is also subject to a set of constraints. Among them are constraints on the number of pallets that can be shipped on a given vehicle:

$$\sum_{SKU} x_{SKU,V,R,S,D,i,n} \leq \text{MaxPalletsPerVehicle}(V)$$

where MaxPalletsPerVehicle is 44 for a typical trailer, but can vary, depending on the type of vehicle used as described herein. This constraint applies whenever the pallets move on a vehicle.

Similarly, the weight constraint must be met:

$$\sum_{SKU} \text{WeightPerPallet}(SKU) x_{SKU,V_1,R,S,D,i,n} \leq \text{MaxWeightPerVehicle}(V)$$

where MaxWeightPerVehicle would be about 44,000 lbs. for a typical trailer. Again, this parameter is a function of vehicle type as described herein.

In this simplified case, since a pallet size is standardized, it is assumed that the volume constraint is accounted for by the pallet count constraint.

A non-negativity constraint must also be met for shipments:

$$x_{SKU,V,R,S,D,i,n} \geq 0$$

This constraint applies for all SKU, V, R, S, D, i, and n.

Finally, there is the flow constraint on each node, where the net flow of product through a node must exceed some minimum value, and must not exceed some maximum:

$$\sum_{V} (x_{SKU,V,R,S,D,i,n} - x_{SKU,V,R,S,D,n,j}) \leq \text{MaxNetNodeFlow}(SKU, n)$$

$$\sum_{V} (x_{SKU,V,R,S,D,i,n} - x_{SKU,V,R,S,D,n,j}) \geq \text{MinNetNodeFlow}(SKU, n)$$

where MaxNetNodeFlow and MinNetNodeFlow are the maximum and minimum value for the number of pallets that enter the node, less the number that leave. For a source, these numbers are typically negative. For a destination, these numbers are expected to be positive. For a transshipment point, these numbers typically zero. The above constraint applies to all nodes, whether they are sources, destinations, or cross-docks. The only difference between these three different types of nodes is the value of the parameters MaxNetNodeFlow and MinNetNodeFlow, which are functions of the node and the SKU.

If the objective function and the constraints can be formulated as linear functions, a linear program can be formulated based on this problem and solved.

Figure 7:
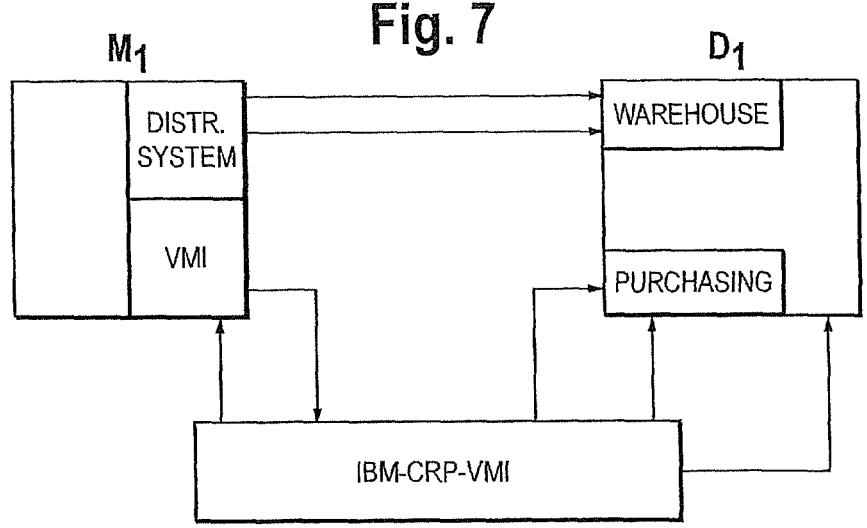
FIG. 7 is a block diagram of a remote vendor managed inventory model.

FIG. 7 demonstrates one prior art system for VMI management. This system is based on the IBM Continuous Replenishment Process (CRP) VMI system. Essentially, one part of the IBM VMI system records the inventory of the distributor at the day's close. This part then transmits the information to the main VMI server. The server prioritizes optimal or substantially optimal shipment levels. This information is then transmitted to the distributor's purchasing department and the manufacturer's VMI system operator for approval. The manufacturer's VMI then receives a purchase order from the VMI server and acknowledges receipt of the purchase order. The VMI server also sends an acknowledgement to the distributor that the manufacturer has accepted the VMI purchase order. Meanwhile, the manufacturer's VMI system operator then cuts a sales order at the manufacturer site and processes a shipment. An order acknowledgement and an advance shipping notice is sent from the VMI server to the distributor notifying it about the order, contents, estimated time of arrival, price, etc. The merchandise is then shipped from the manufacturer to the distributor. As can be seen, this is a typical VMI system in which because of the "open books" format of the distributor, the manufacturer can regulate the inventory levels at the distributor.

Figure 8:
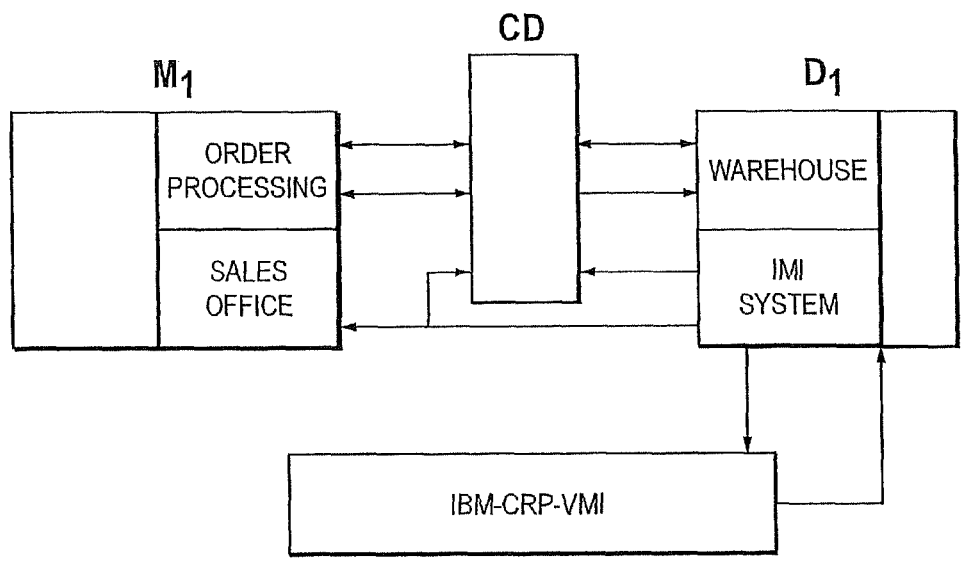
FIG. 8 is another embodiment of the presently described technology.

FIG. 8 demonstrates an embodiment of the presently described technology integrating the IBM VMI system. The presently described technology may also include the allocation resource protocol set forth in U.S. Pat. No. 5,216,593 (issued 1 Jun. 1993); or the optimized logistics planner disclosed in U.S. Pat. No. 5,450,317 (issued 12 Sep. 1995); or the integrated monitoring system disclosed in U.S. Pat. No. 5,983,198 (issued 9 Nov. 1999); the disclosures of which are expressly incorporated by reference herein. As before, the VMI system records the inventory levels at the distributor. This information is sent to the VMI server, which correlates optimal shipment levels outbound from the cross-dock for each manufacturer and prioritizes merchandise. An independently managed inventory system provider (IMI) system of the presently described technology reads the VMI information, such as the optimized shipping schedules at the distributor site. Based on the vehicle capacity, the IMI system of the presently described technology generates another set of purchase orders. This new set of orders may, but need not be, taken to the distributor's purchasing manager for approval. This new set of orders may reflect the cost savings for substantially optimizing the truckload. The approved order is sent to the manufacturer and the cross-dock. The central facility substantially optimizes the shipment from the manufacturer into the cross-dock by arranging for pick up, etc. In the meanwhile, the approved order arrives at the manufacturer for approval, processing, and subsequent shipment from the manufacturer to the cross-dock. Merchandise arrive at the cross-dock and are substantially optimized with other merchandise going to the same distributor. Ultimately, the merchandise of a variety of manufacturers arrive at the distributor. Thus, as shown, the IMI can be an independent third party company, that is, a company not related to the distributor or manufacturer.

Figure 9:
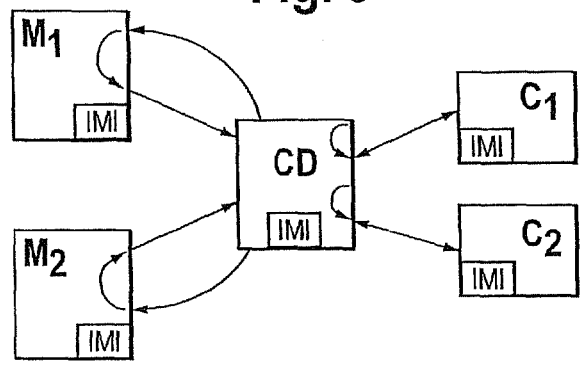
FIG. 9 is another embodiment of the presently described technology.

FIG. 9 demonstrates an embodiment in which the distributor is eliminated. In this embodiment, by refining the calculations, near full truckload capacity can be achieved without using a distributor. In this example, the IMI system may be part of the customer's facility in which the cross-dock IMI system monitors the inventory level at the customer. The cross-dock IMI assembles and correlates the inventory levels across all the customers. Thus, the cross-dock IMI derives a truckload capacity and the requirements of each customer. This information is substantially optimized and sent to the various manufacturers. Once it is determined what vehicle the manufacturer will use for transport, the IMI system will substantially optimize the capacity utilization of the vehicle by adding more merchandise to the truck. Meanwhile, this process continues across all the vehicles receiving goods from all the manufacturers. In this regard, this creates substantially maximum shipping capacity from the manufacturers to the cross-dock. The merchandise are then unloaded and reassembled into similar destinations. Since the IMI has already substantially optimized what merchandise are needed by the customers, the cross-dock system will collect similarly destined merchandise and substantially maximize truckload capacity to the customer. Vehicle size such as truck size can be adjusted by using smaller trucks or larger ones as needed.

Since technology permits logistics to be computerized, the presently described technology may partially reside in a computerized form. For example, the presently described technology may include a computer program embodied on a tangible medium, such as a disk drive, CD ROM, network, floppy disk, zip drive, or server, to optimize shipment of merchandise on a vehicle by filling/loading or substantially filling/loading the vehicle. The computer program may include a first set of instructions to determine a vehicle load capacity; a second set of instructions to determine a shipment requirement or discretionary order; a third set of instructions to generate a comparison by comparing the vehicle load capacity with the shipment requirement; and a fourth set of instructions to load more merchandise on the vehicle if the comparison indicates that the vehicle is not yet full/loaded or substantially full/loaded. These instructions may also code for monitoring the inventory levels at the distributor, manufacturer, customer, or cross-dock.

The presently described technology may also reside in a signal. The signal may further include other signals that: (a) signal the inventory level at the customer, manufacturer, distributor, or cross-dock; (b) identify maximum vehicle load capacity; (c) facilitate replenishment of the vehicle if the vehicle is not yet full; (d) facilitate correlations at the cross-dock; (e) provide feedback to the manufacturer, distributor, customer, or cross-dock; (f) provide a purchase order generation and confirmation system; or (g) otherwise permit vehicle capacity to be maximized.

It is appreciated by those skilled in the art that the process shown herein may selectively be implemented in hardware, software, or a combination of hardware and software. An embodiment of the process steps employs at least one machine-readable signal-bearing medium. Examples of machine-readable signal-bearing mediums include computer-readable mediums such as a magnetic storage medium (i.e., hard drives, floppy disks), or optical storage such as compact disk (CD) or digital video disk (DVD), a biological storage medium, or an atomic storage medium, a discrete logic circuit(s) having logic gates for implementing logic functions upon data signals, an application specific integrated circuit having appropriate logic gates, a programmable gate array(s) (PGA), a field programmable gate array (FPGA), a random access memory device (RAM), read only memory device (ROM), electronic programmable random access memory (EPROM), or equivalent. Note that the computer-readable medium could even be paper (e.g., tape or punch cards) or another suitable medium, upon which the computer instruction is printed, as the program can be electronically captured, via for instance optical scanning of the paper or other medium, then compiled, interpreted or otherwise processed in a suitable manner if necessary, and then stored in a computer memory.

Additionally, machine-readable signal bearing medium includes computer-readable signal-bearing mediums. Computer-readable signal-bearing media have a modulated carrier signal transmitted over one or more wire-based, wireless or fiber optic networks or within a system. For example, one or more wire-based, wireless or fiber optic network, such as the telephone network, a local area network, the Internet, or a wireless network having a component of a computer-readable signal residing or passing through the network. The computer-readable signal is a representation of one or more machine instructions written in or implemented with any number of programming languages.

Furthermore, the multiple process steps implemented with a programming language, which comprises an ordered listing of executable instructions for implementing logical functions, can be embodied in any machine-readable signal bearing medium for use by or in connection with an instruction execution system, apparatus, or device, such as a computer-based system, controller-containing system having a processor, microprocessor, digital signal processor, discrete logic circuit functioning as a controller, or other system that can fetch the instructions from the instruction execution system, apparatus, or device and execute the instructions.

Figure 10:
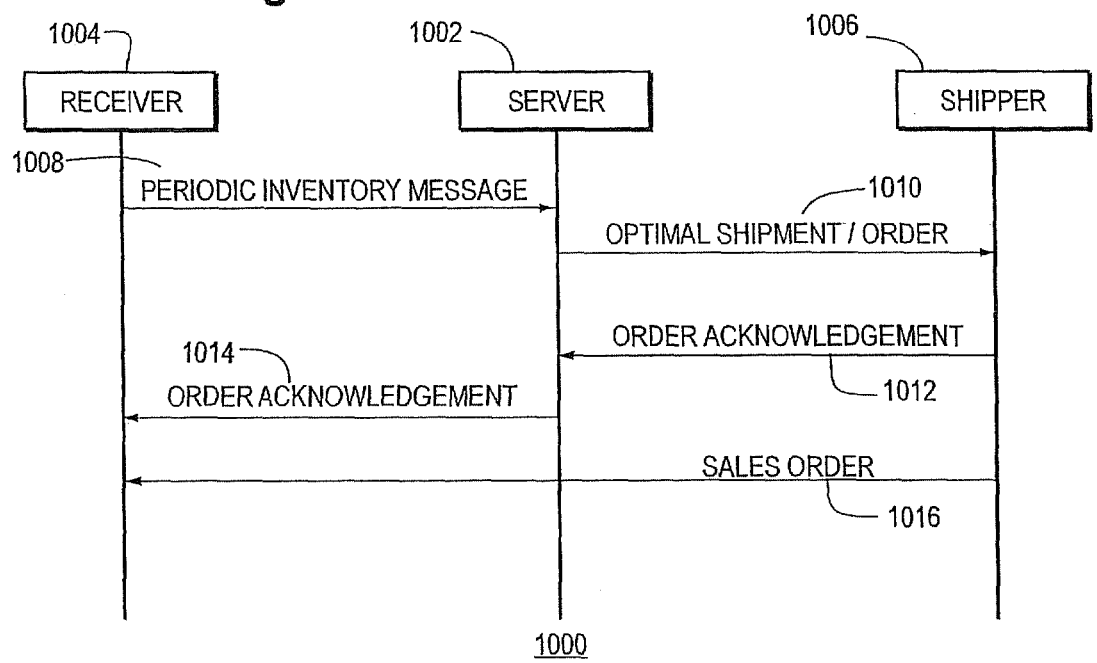
FIG. 10 is a message flow diagram of the presently described technology.

In FIG. 10, a message flow diagram 1000 for the optimizing transport vehicle load capacity process is shown. A server 1002, such as a VMI server, sends and receives messages from a distributor 1004 and a manufacturer 1006. A distributor 1004 sends a periodic inventory message 1008 to the server 1002. The periodic inventory message 1008 is preferably sent every business day, but in alternate embodiments may be sent hourly, daily, bi-weekly, weekly, monthly, or some upon some other triggering event (e.g., changes in inventory level). The periodic inventory message is formatted so information contained in the message corresponds to the removed or sold distributor inventory. The server 1002 receives the periodic inventory message 1008 and processes it using information about the inventory needs stored in a database. The database contains information about the type and amount of inventory normally maintained by the distributor 1004.

The server 1002 also has access to vehicle load sizes that are also stored in the database. The server 1002 determines the optimal shipment to meet the inventory needs of the distributor 1004 and sends an optimal shipment order message 1010 to the manufacturer 1006. The server 1002 then receives an order acknowledgement 1012 from the manufacturer 1006 signifying that the order has been received. The server 1002 sends an order acknowledgement message 1014 to the distributor 1004 in response to reception of the order acknowledgement message 1012 from the manufacturer 1006. A sales order 1016 is also sent from the manufacturer 1006 to the distributor 1004.

Figure 11:
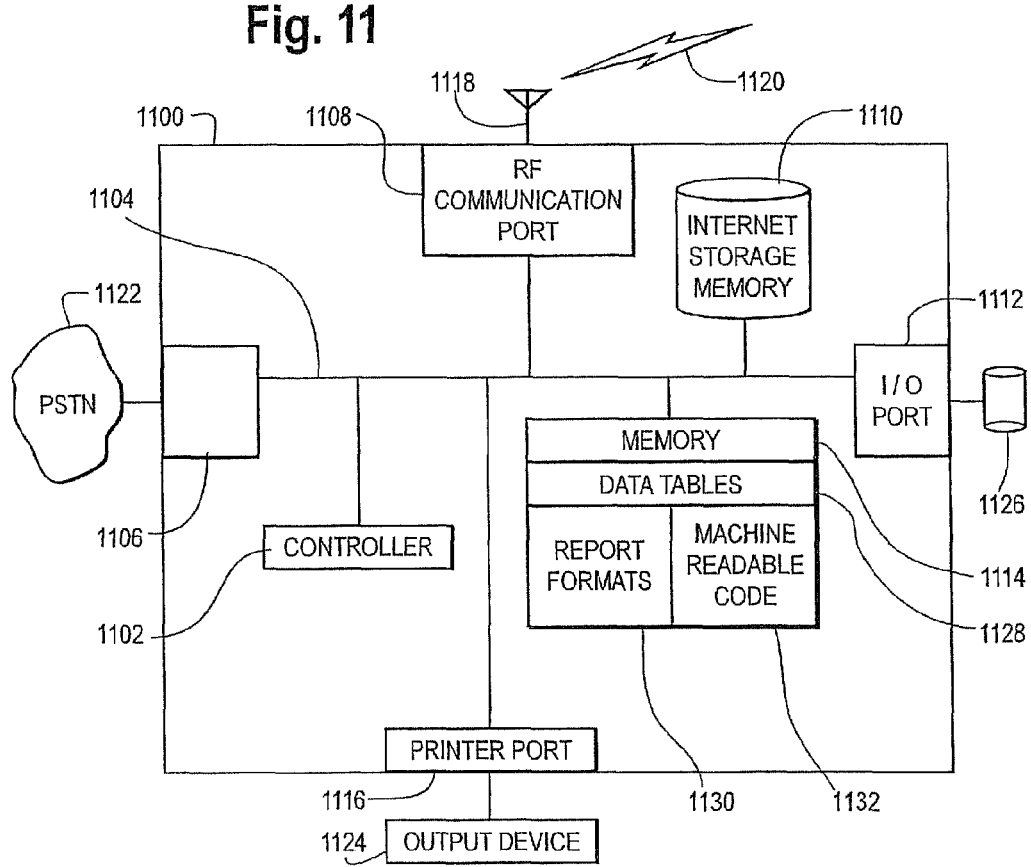
FIG. 11 is a server block diagram of the system of the presently described technology.

In FIG. 11, a server 1100 that performs the optimizing transport vehicle load capacity process is shown. The server 1100 is made up of a number of components including a controller 1102 connected to a data bus 1104. The data bus is connected to a communication port 1106, a RF communication port 1108, an internal storage medium 1110, an input/output port 1112, a memory 1114, and a printer port 1116. The RF communication port 1108 is connected to the data bus 1104 and an antenna 1118 for reception of RF signals 1120. The communication port 1106 is connected to the data bus 1104 and a public switched telephone network (PSTN) 1122. The printer port 1116 is connected to the data bus 1104 and the output device 1124 (printer, video display, LCD display, or any other device capable of generating an output viewable by a human). The input/output port 1112 is connected to the data bus 1104 and an external storage device 1126. The memory 1114 contains database tables 1128, report formats 1130 and machine readable code 1132.

As shown in FIG. 10, a distributor 1004 sends a periodic inventory message 1008 via the PSTN 1122 (see FIG. 11) to the server 1100. The server 1100 receives the periodic inventory message 1008 (see FIG. 10), at the communication port 1106 (see FIG. 11). The controller 1102 accesses the periodic inventory message 1008 (see FIG. 10), over the data bus 1104. The controller 1102 accesses the database tables 1128 to determine what inventory the distributor 1004 (see FIG. 10) requires. The controller 1102 executing the machine-readable code 1132, such as "C++" code, identifies one or more vehicle(s) and vehicle load size contained in the database tables 1128. The controller then generates an optimal shipment order 1010 (see FIG. 10). The optimal shipment order can then be printed out to an output device 1124 (see FIG. 11) by the printer port 1116 and sent to the manufacturer 1006 (see FIG. 10) by the communication port 1106 (see FIG. 11) via the PSTN 1122. The format of the printed out substantially optimal shipment order 1010 (see FIG. 10) is determined by the report format 1130 contained in the memory 1114 of the server 1100. In alternate embodiments, a different type of communication network other than a PSTN 1122 may be accessed, such as a packet-switch network, wireless network, hybrid-fiber network, LAN, WAN, or a combination of networks.

The controller 1102 generates the optimal shipment order message to substantially maximize the capacity utilization of one or more vehicle(s) from the manufacturer 1006 to the distributor 1004. After the optimal shipment message 1010 is sent to the manufacturer 1006, the server 1002 receives an order acknowledgement message 1012 from the manufacturer 1006 at the communication port 1106 via the PSTN 1122. The controller 1102 formats an order acknowledgement message 1014 (see FIG. 10) for the distributor 1004 upon receipt of the order acknowledgement message 1012 from the manufacturer 1006. Additionally, the manufacturer 1006 may send a sales order 1016 directly to the distributor 1004. The server 1002 may also cut a purchase order to the carrier via the communication port 1106.

As with any embodiment, the system may also include vehicles equipped with satellite tracking systems, such as a Global Positioning System. For example, the system may include a QTRACS system manufactured by Qualcomm, Inc. to monitor vehicle position. In this regard, coordination at the cross-dock may be facilitated knowing that inbound trucks are coming, or otherwise provide dynamic shipping information. In addition, the tracking permits rapid communication with the customer to inform them that a truck is expected soon or that the truck is remaining on schedule. As with any embodiment herein, all communications between units or components, may be via cellular, telephone lines, satellite, wireless, etc. In other embodiments, the GPS technology may be utilized with the pallets, boxes, cartons, or the like themselves. In particular, GPS may be used with high value items so that tracking these items is facilitated. In other embodiments, using transponders, such as RF transponders, the pallets or goods themselves could be tracked to see what goods are on what truck. If GPS is used with the truck, then it becomes rudimentary to know what goods (e.g. what pallets) are where at all times.

The server 1100 is able to receive global positioning service (GPS) data about vehicle positions from an RF communication port 1108. The controller 1102 correlates the data about the vehicle positions in order to identify a vehicle to carry the shipment. The vehicle selection and inventory requirements are both used by the controller 1102 to identify the optimal shipment order. The controller 1102 also receives vehicle position data from the RF port 1108, and uses it to determine estimates on arrival times to a cross-dock, correlates these arrival times, and modifies shipping schedules to substantially optimize logistics costs. In an alternate embodiment, the GPS data is received at the server 1100 via the communication port 1106.

As with any embodiment described herein, the merchandise may be prioritized based on any immediate, medium term, or long term needs. Accordingly for example, immediately needed merchandise at the cross-dock can be substantially optimized with medium term needed merchandise. Similarly, the optimization function may be performed concurrently with order placement or before. The optimization may be based on a single vehicle, or by obtaining a globally and substantially optimized value across a plurality of vehicles. Similarly, as with any embodiment, there may be single or a plurality of manufacturers, distributors, customers, or cross-docks. The system can accommodate multiple pick-ups and drop-offs on vehicle trips between the shipper and receiver.

Similarly, the various entities involved may be geographically closely located, or quite some distance apart. In one embodiment though, having the cross-dock in relatively the same geocenter will facilitate implementation of the system. In addition, as with any embodiment herein, the system may be divided up so that various components are not in the same location. For example, order processing can be geographically remote from any other entity, such as the cross-dock or the manufacturers. On the other hand, system implementation may occur in generally the same location or at the same facility, such as if most of the IMI system is at the distributor facility. In addition, it should be recognized that the legal entity receiving the goods could be a different entity than the one that actually receives the goods. For example, Company X headquartered in California may be the legal entity "receiving" the goods, but the actual shipping location to receive the goods could be in Illinois. It should also be appreciated that the presently described technology may include many cross-docks, either all or some located in the same geocenter; and/or all cross-docks in different geocenters. It should also be appreciated that the presently described technology may schedule shipments that may require products to pass through multiple cross-docks.

In yet another embodiment, the presently described technology may be adapted to provide shipping to remote locations not currently accessible by road. For example, most shipping to the Hawaiian Islands is via boat. However, the presently described technology may be adapted to coordinate and substantially optimize shipments of goods from across the country (or the world) into the shipping port, for subsequent shipment to Hawaii.

Figure 12:
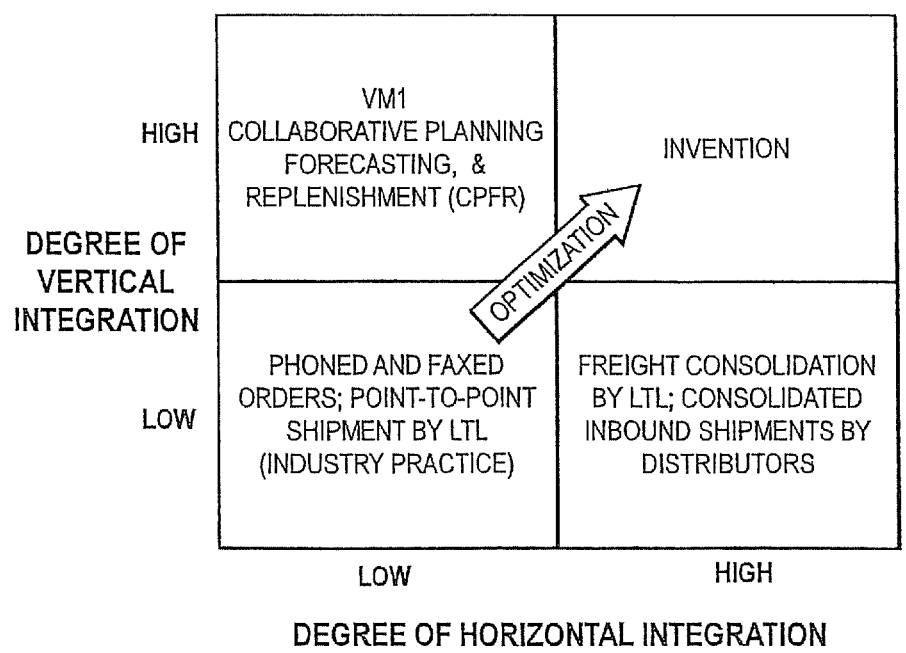
FIG. 12 demonstrates another feature of the presently described technology.

FIG. 12 also demonstrates another feature of the presently described technology. The optimization step may further include the step of exercising discretionary control over the products to be shipped. In this regard, higher priority goods may be shipped and lower priority goods not shipped for later shipment. Thus, the presently described technology contemplates the step of prioritizing the products to be shipped. The presently described technology also includes the ability to optimize shipments for horizontal integration across different legal entities. The presently described technology also includes the ability to vertically integrate where multiple shipments across time are now consolidated into one shipment. Thus, the presently described technology includes the step of substantially optimizing the product shipment temporally among at least one other shipment.

Thus, many features of the presently described technology are realized singularly or in combination, such as, but not limited to, the prioritization step further including the step of determining at least one of the following steps:
(a) calculating a mix of additional products to be added to at least part of the shipment when a total amount of product shipped is greater than a minimum amount of product initially ordered;
(b) calculating a mix of additional product to be added to at least part of the shipment when the maximum vehicle load is not exceeded;
(c) scheduling the shipment from the plurality of shippers to arrive at a cross-dock before shipping the product to the at least one receiver; and
(d) substantially optimizing the optimization metric.

Accordingly, the presently described technology also includes the step of manipulating the shipment at a cross-dock in the manners described herein. This may include the use of destination indicia and may further include ensuring that products entering the cross-dock have a predefined destination beyond the cross-dock. As mentioned herein though, the cross-dock is not critical to the operation of the presently described technology. For example, optimization may occur without the physical cross-dock. Two trucks operating within the presently described technology system may meet somewhere, such as a truck stop or rest stop. In one example, the first truck unhitches its trailer and re-hitches it to the second truck. In this manner, the presently described technology contemplates that optimization of these trailers may be in order to substantially maximize that one truck carrying two trailers arrives at a receiver. In another example, the contents of the first truck may be packed into the second truck so that the second truck capacity is substantially maximized, without the use of formal cross-dock.

Therefore, one embodiment of the presently described technology comprises a method of substantially optimizing a shipment of at least one product from a plurality of shippers to at least one receiver, the plurality of shippers comprising different legal entities; or a method of substantially optimizing shipments from a plurality of shippers to a plurality of receivers; or a method of substantially optimizing shipments from at least one shipper to at least one receiver, the presently described technology comprising the steps of determining a maximum or substantially maximum load of at least one transport vehicle from the shippers; and substantially optimizing the maximum or substantially maximum load of the least one transport vehicle.

As with any embodiment, optimization may include one or more factors, such as the step of determining at least one of a substantially maximum mass, maximum length, maximum height, maximum width, maximum volume, and pallet footprint of the at least one transport vehicle. Optimization may further include the step of establishing at least one optimization metric, which may include but is not limited to, a metric establishing step which further includes the step of establishing at least one of the following metrics: a capacity utilization per vehicle mile, total transportation cost metric; transportation cost as percentage of product value shipped metric; total logistics costs; shipping revenue metric; and shipping revenue less freight cost metric.

As an inducement to participate, the presently described technology also contemplates the providing of a trade allowance to the receiver, for example, from the IMI to the receiver. The trade allowance may include, but is not limited to, a rebate. Other inducements such as percent off, coupons, rebates, premium give-away, or other such commonly known features are expressly contemplated.

The presently described technology also allows for a profit sharing program, which is a further benefit to manufacturers, distributors, and in particular, customers. For example, for any given route run (the series of pick-ups and drop-offs a truck goes through before returning to its original starting location) where there are at least two customers, distributors, or manufacturers involved (in any combination), a gross margin percentage may be calculated from taking the total revenue generated by the route and subtracting the total costs of the route. In doing so, one is able to calculate the percentage remaining of the total revenue generated from the operation of a particular route. For each member (i.e., C, M, or D), that percentage remaining is then multiplied by that member's gross revenue from the particular route run to determine the amount of profit sharing.

More specifically, by way of one illustrative example, assume a customer C1 had $1,000 dollar revenue generated from the run/route, customer C2 had $2,000 dollar revenue generated from the route run, and the gross margin percentage was 30%. Utilizing the profit sharing program of the presently described technology, customer C1 would receive 30% of $1000 and customer C2 would receive 30% of $2000 as their respective profit sharing for the particular run/route.

It should be understood that the foregoing relates only to a limited number of embodiments that have been provided for illustration purposes only. It is intended that the scope of invention is defined by the appended claims and that modifications to the embodiment above may be made that do not depart from the scope of the claims.

We claim:

1. A system for optimizing the shipment of merchandise, said system including:
   one or more transport vehicles, said one or more transport vehicles transporting a shipment from a first shipper and a second shipper to a first receiver and a second receiver,
   wherein said first receiver maintains a first inventory of merchandise at a first receiver location, wherein a first inventory determination determines the limits of merchandise required to be maintained for said first inventory according to one or more first metrics in response to first data received from said first receiver,
   wherein said second receiver maintains a second inventory of merchandise at a second receiver location, wherein a second inventory determination determines the limits of merchandise required to be maintained for said second inventory according to one or more second metrics in response to second data received from said second receiver; and
   computer hardware, computer software stored on a computer and operating on a computer or a combination of computer hardware and computer software stored on a computer and operating on a computer determining a shipment of merchandise,
   wherein said shipment of said merchandise is optimized by determining one or more maximum loads of said one or more transport vehicles at least in part by calculating an amount of merchandise for shipment by said one or more transport vehicles from said first and second source locations to said first and second receivers that reduces logistics costs and that results in shipment of merchandise within the limits of merchandise required to be maintained for the first inventory and within the limits of merchandise required to be maintained for the second inventory according to a calculation employing at least said one or more first metrics, said one or more second metrics, said first data, and said second data.

2. The system of claim 1 wherein the one or more first metrics comprise a level of the first inventory and wherein the one or more second metrics comprise a level of the second inventory.

3. The system of claim 1 wherein the one or more first metrics comprise prescheduling of the delivery of the merchandise to the first receiver and wherein the one or more second metrics comprise prescheduling of the delivery of the merchandise to the second receiver.

4. The system of claim 1 wherein the merchandise comprises first merchandise having a first priority and second merchandise having a second priority less than the first priority and wherein the one or more first and second metrics comprise at least one priority value.

5. The system of claim 4 wherein the first merchandise and the second merchandise comprise different types of merchandise.

6. The system of claim 1 wherein the one or more transport vehicles have one or more capacities and wherein the one or more first and second metrics comprise the amount of the one or more capacities filled with the merchandise.

7. The system of claim 1 wherein the one or more first and second metrics comprise a quantity of the merchandise and a time of transportation of the merchandise.

8. The system of claim 1 wherein said first inventory determination comprises deriving from the first data the level of the first inventory and identifying the quantities of the merchandise shippable to maintain the first inventory as required.

9. The system of claim 1 wherein the merchandise is available at a distribution point displaced from the first and second receiver locations and displaced from the first and second shipper locations, wherein the one or more transport vehicles have one or more capacities, and wherein the determination of one or more maximum loads includes the calculation of:
   a quantity of the merchandise for shipment by the one or more vehicles from the distribution point to the first receiver location, and
   a quantity of the merchandise for shipment by the one or more vehicles from the distribution point to the second receiver location.

10. The system of claim 1 wherein the one or more first and second metrics comprise a maximum feasible order size and wherein said calculating comprises calculating the maximum feasible order size that maintains the inventory within the amount of products required to be maintained.

11. A method for optimizing the shipment of merchandise, said system including:
    determining a shipment of merchandise using computer hardware, computer software stored on a computer and operating on a computer or a combination of computer hardware and computer software stored on a computer and operating on a computer,
    wherein said shipment is from a first shipper and a second shipper to a first receiver and a second receiver,
    wherein said first receiver maintains a first inventory of merchandise at a first receiver location, wherein a first inventory determination determines the limits of merchandise required to be maintained for said first inventory according to one or more first metrics in response to first data received from said first receiver,
    wherein said second receiver maintains a second inventory of merchandise at a second receiver location, wherein a second inventory determination determines the limits of merchandise required to be maintained for said second inventory according to one or more second metrics in response to second data received from said second receiver; and
    transporting a shipment from a first shipper and a second shipper to a first receiver and a second receiver, wherein said transporting employs one or more transport vehicles,
    wherein said shipment of said merchandise is optimized by determining one or more maximum loads of said one or more transport vehicles at least in part by calculating an amount of merchandise for shipment by said one or more transport vehicles from said first and second source locations to said first and second receivers that reduces logistics costs and that results in shipment of merchandise within the limits of merchandise required to be maintained for the first inventory and within the limits of merchandise required to be maintained for the second inventory according to a calculation employing at least said one or more first metrics, said one or more second metrics, said first data, and said second data.

12. The method of claim 11 wherein the one or more first metrics comprise a level of the first inventory and wherein the one or more second metrics comprise a level of the second inventory.

13. The method of claim 11 wherein the one or more first metrics comprise prescheduling of the delivery of the merchandise to the first receiver and wherein the one or more second metrics comprise prescheduling of the delivery of the merchandise to the second receiver.

14. The method of claim 11 wherein the merchandise comprises first merchandise having a first priority and second merchandise having a second priority less than the first priority and wherein the one or more first and second metrics comprise at least one priority value.

15. The method of claim 14 wherein the first merchandise and the second merchandise comprise different types of merchandise.

16. The method of claim 11 wherein the one or more transport vehicles have one or more capacities and wherein the one or more first and second metrics comprise the amount of the one or more capacities filled with the merchandise.

17. The method of claim 11 wherein the one or more first and second metrics comprise a quantity of the merchandise and a time of transportation of the merchandise.

18. The method of claim 11 wherein said first inventory determination comprises deriving from the first data the level of the first inventory and identifying the quantities of the merchandise shippable to maintain the first inventory as required.

19. The method of claim 11 wherein the merchandise is available at a distribution point displaced from the first and second receiver locations and displaced from the first and second shipper locations, wherein the one or more transport vehicles have one or more capacities, and wherein the determination of one or more maximum loads includes the calculation of:

a quantity of the merchandise for shipment by the one or more vehicles from the distribution point to the first receiver location, and a quantity of the merchandise for shipment by the one or more vehicles from the distribution point to the second receiver location.

20. The method of claim 11 wherein the one or more first and second metrics comprise a maximum feasible order size and wherein said calculating comprises calculating the maximum feasible order size that maintains the inventory within the amount of products required to be maintained.

* * * * *